Aug. 10, 1937.  W. F. RIDGWAY  2,089,814
MACHINE TOOL
Filed March 4, 1935  7 Sheets-Sheet 1

INVENTOR
William F. Ridgway
By Parker, Carlson, Pitzner & Hubbard
ATTORNEYS

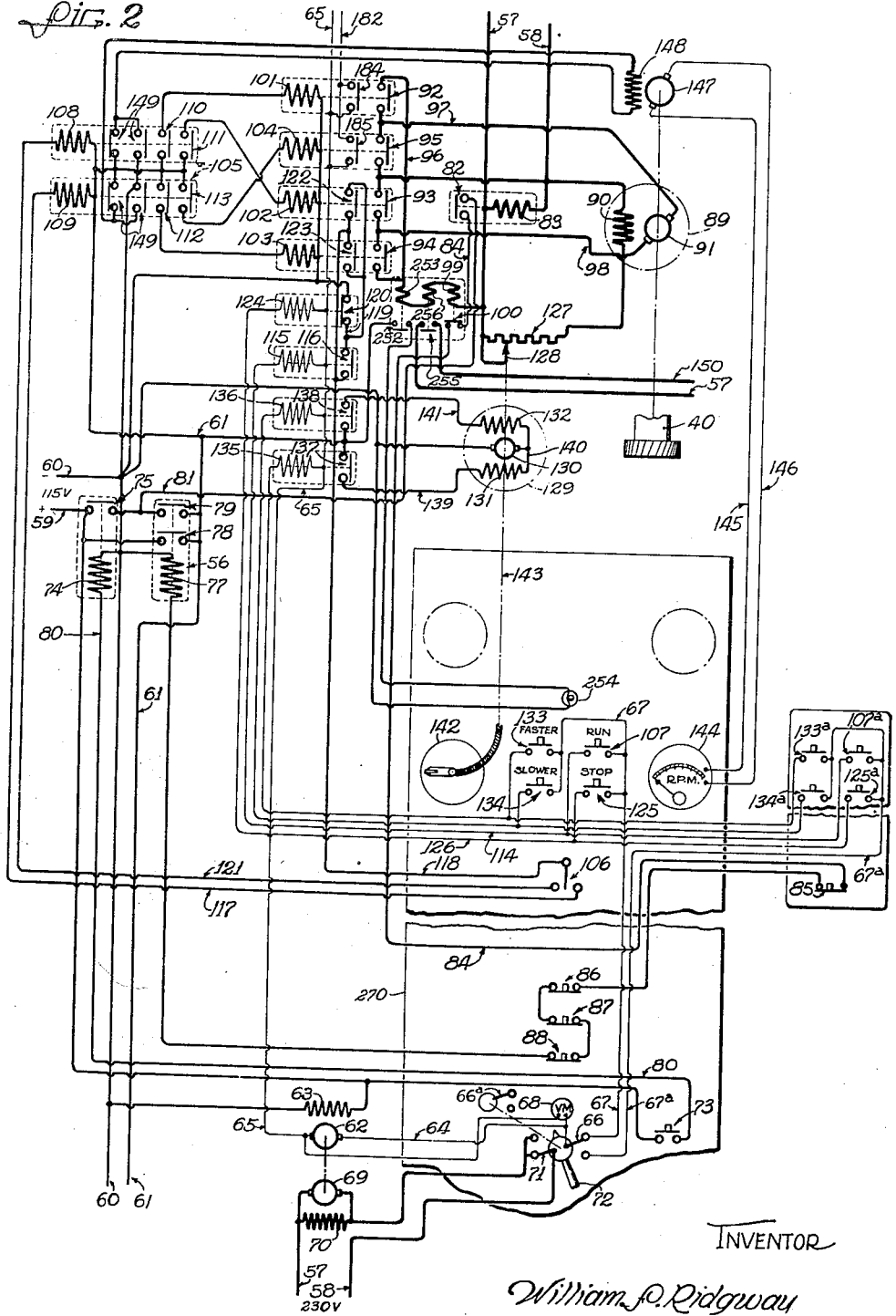

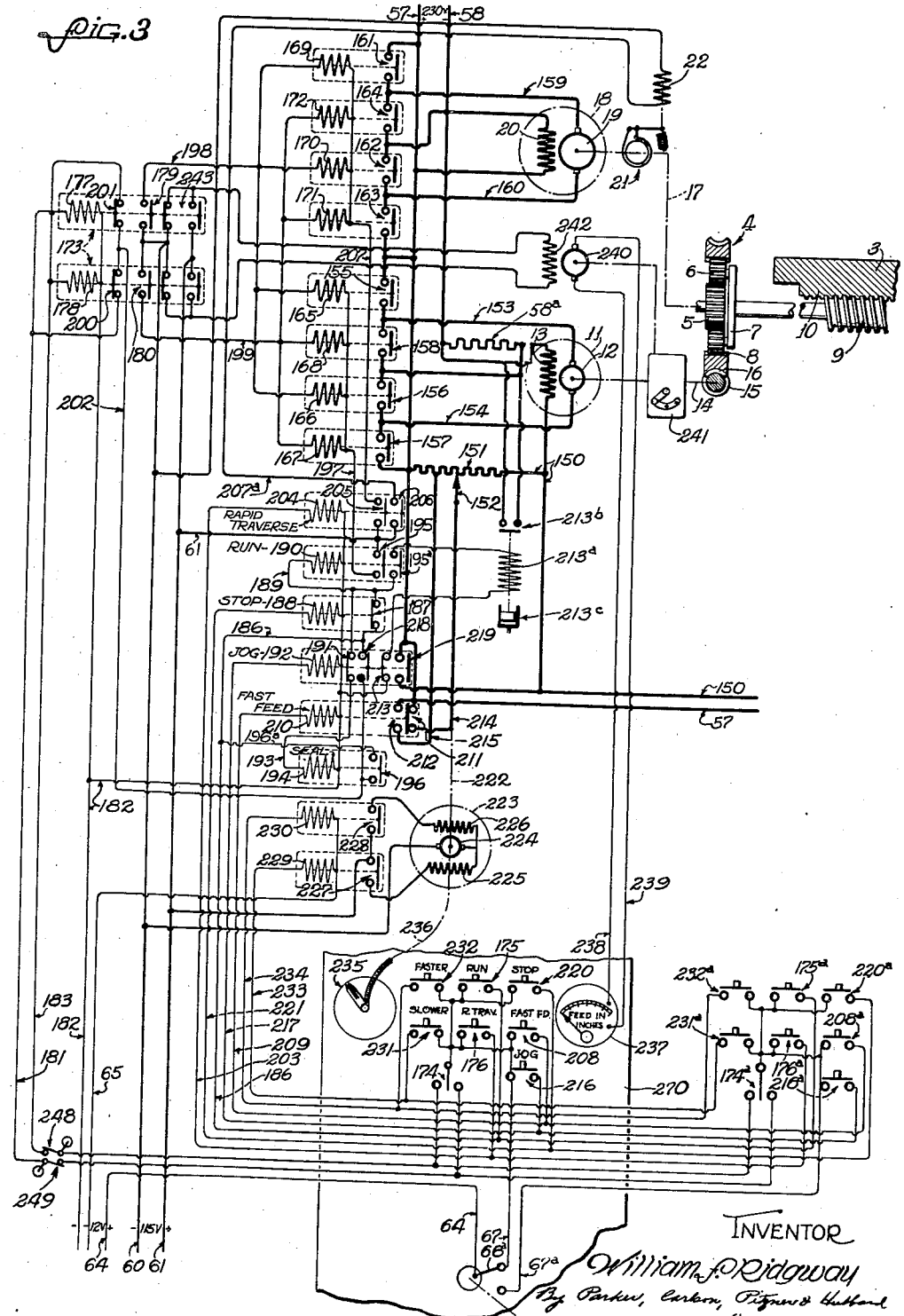

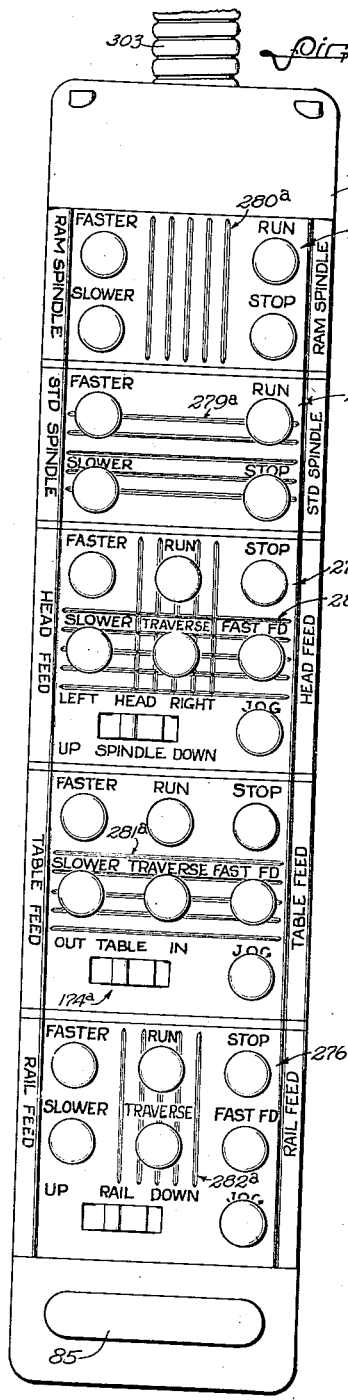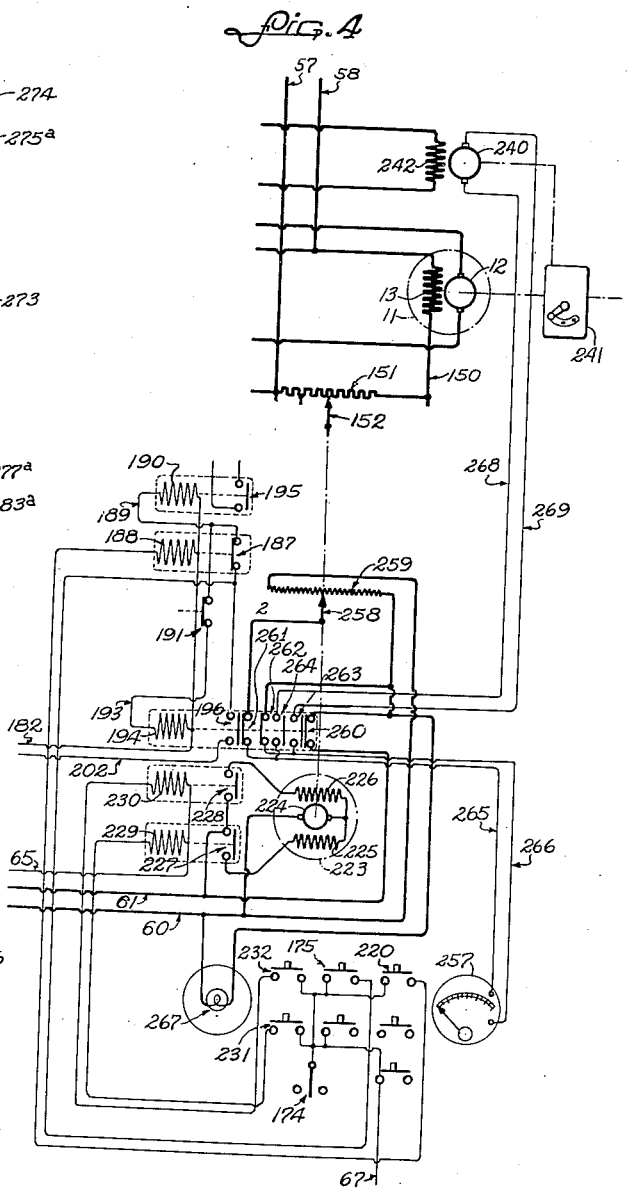

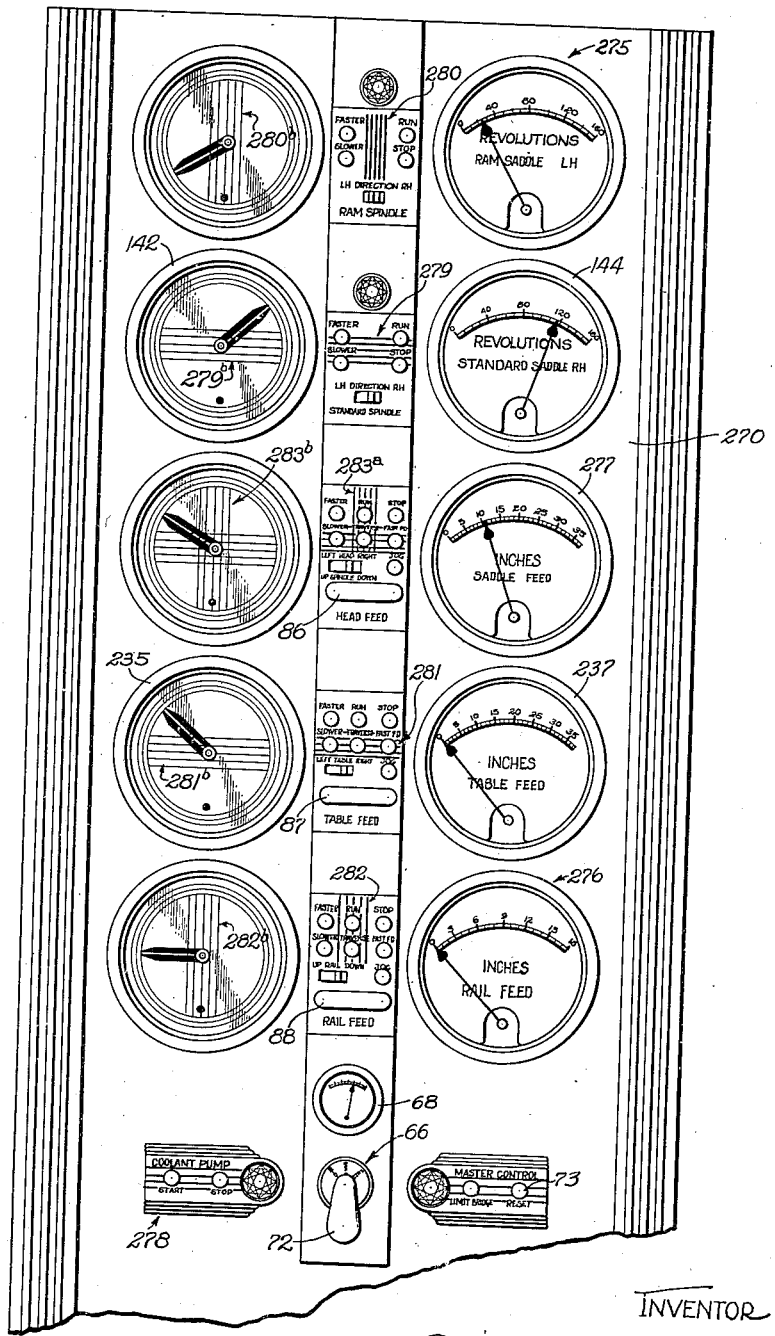

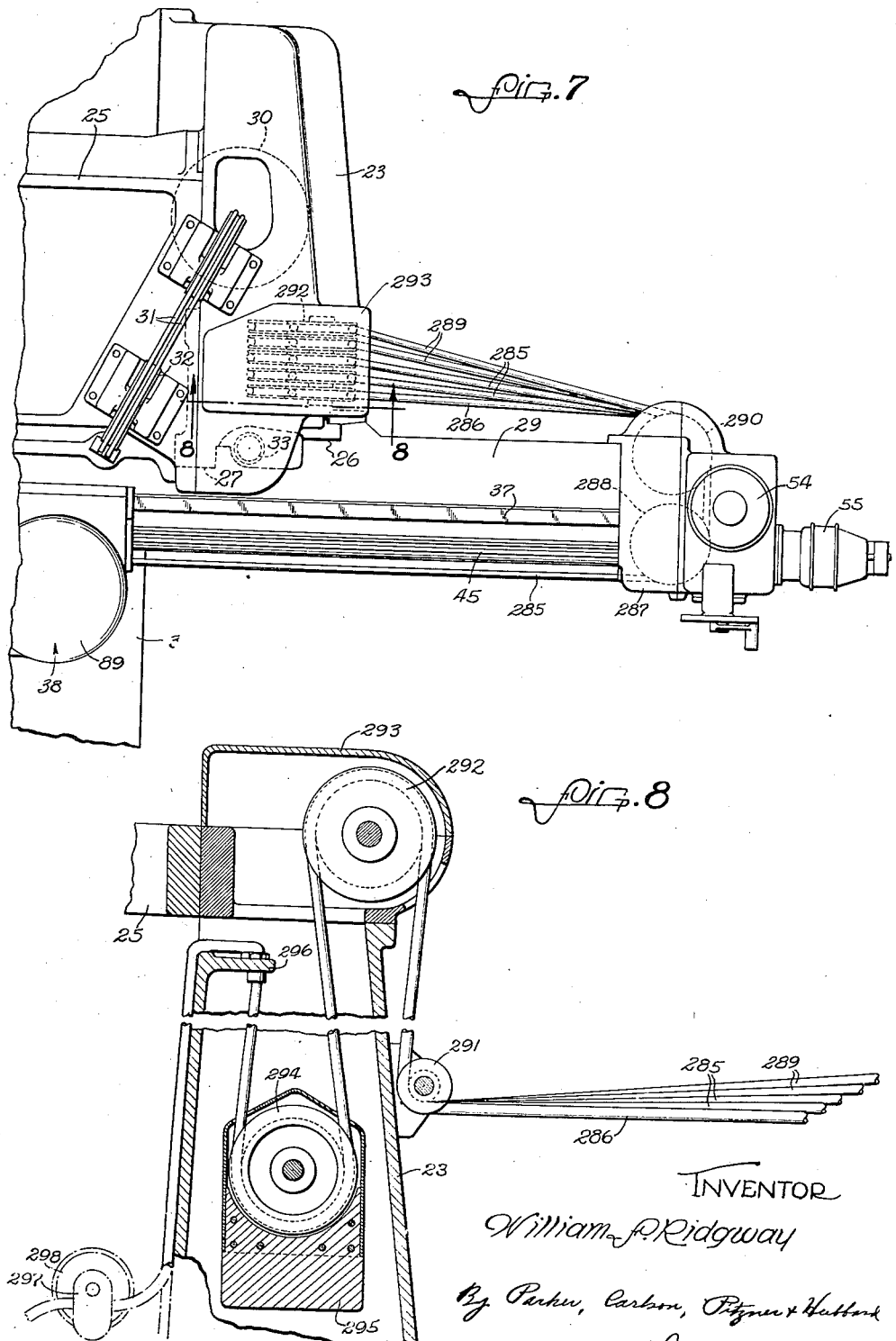

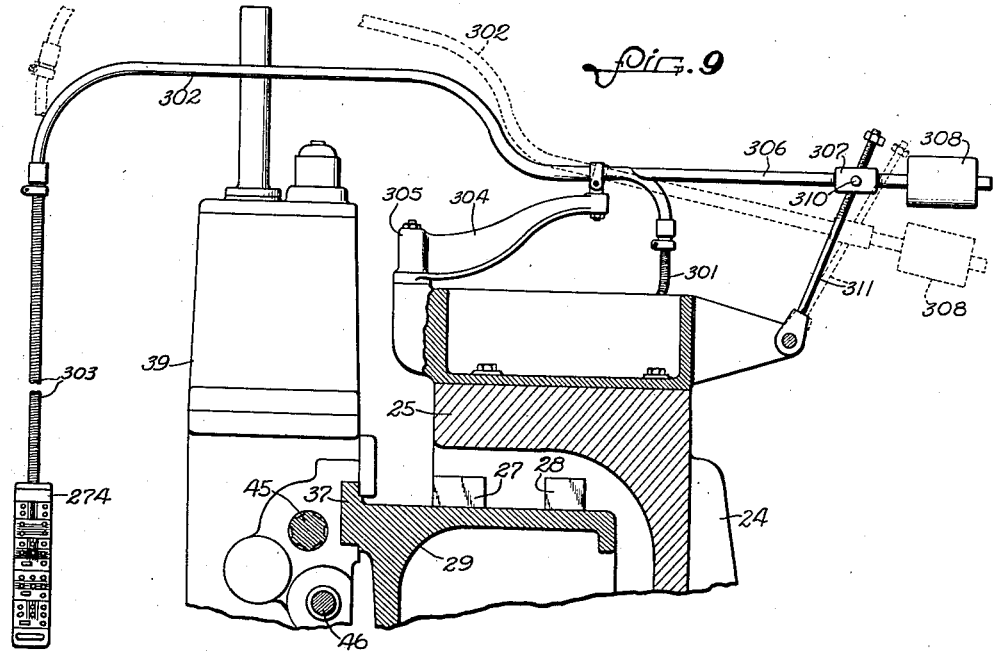
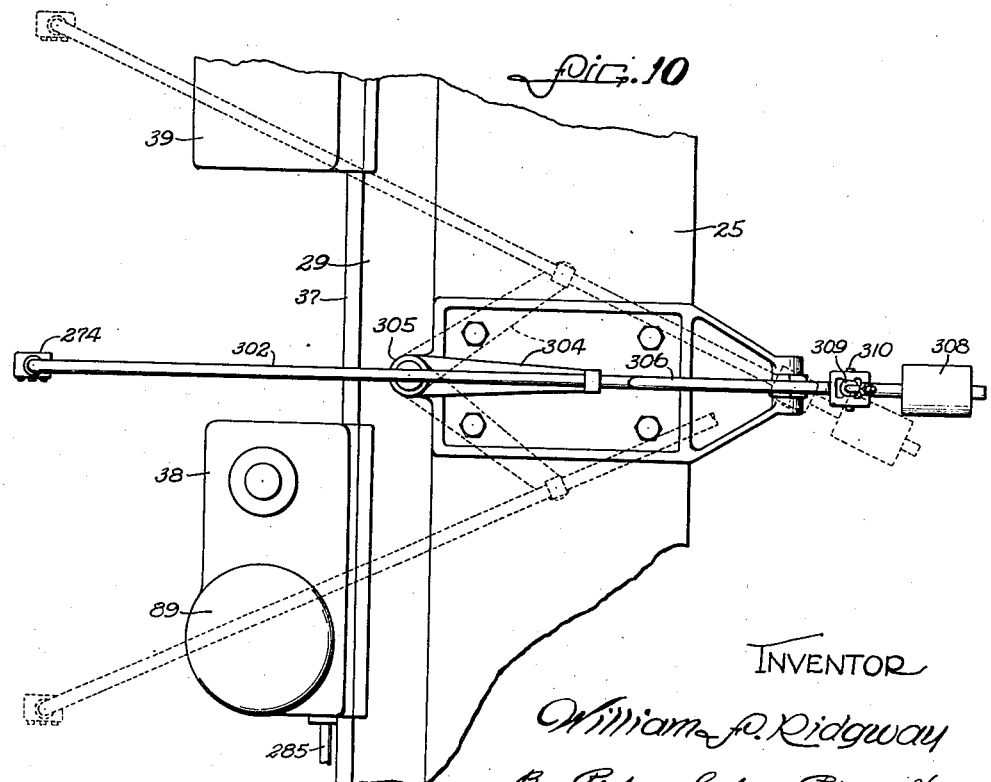

Patented Aug. 10, 1937

2,089,814

UNITED STATES PATENT OFFICE 2,089,814

MACHINE TOOL

William F. Ridgway, Rockford, Ill., assignor to The Ingersoll Milling Machine Company, Rockford, Ill., a corporation of Illinois Application March 4, 1935, Serial No. 9,134

37 Claims. (Cl. 90—21)

The present invention relates to improvements in machine tools, and is particularly adapted for large size machines having a plurality of operative elements, such for example as a cross-rail milling machine.

One of the objects of the present invention resides in the provision, in a machine tool having a plurality of translatory and rotatable elements, of a novel electrical selective drive for all of the elements operable from one control panel.

Another object is to provide a novel system of electrical drives for a plurality of operable machine elements having a selective dual control, for example a control operable selectively either from a stationary panel or from a movable panel in the form of a pendant.

A further object resides in the provision, in a machine tool, of a system of electrical drives for a plurality of selectively operable elements including duplicate selectively available groups of control switches for each drive mounted on two independent panels, and including duplicate visual indicators associated respectively with the corresponding groups of switches for facilitating a ready transfer of attention from any group on one panel to the corresponding group on the other panel.

Another object resides in the provision of novel means for supporting the pendant, and permitting ready and convenient adjustment of the latter in an approximate straight line motion over a substantial area.

Still another object is to provide a new and improved system of electrical drives, for a plurality of machine elements, comprising relatively high voltage motor circuits, and circuits of a relatively low voltage for a series of relays and control switches, and in which the control switches are compactly grouped and arranged in a small pendant.

A further object is to provide an electrical variable speed drive for a machine tool element, comprising a drive motor having an adjustable resistance in one circuit, and means for indicating the adjustment of the resistance and for indicating the speed of the drive.

Another object resides in enclosing the wires of the various circuits leading to the machine elements in conduits which are concealed to a large extent, and are caused to follow the general contour of the machine.

Further objects reside in the provision, in a system of electrical drives for a translatory machine element and a rotary machine element, of any one or more novel interlocks respectively for preventing institution of the translatory drive unless the rotary drive is in operation, for interrupting all of said drives if the translatory element is translated beyond a predetermined point, for adjusting the relative speed of the drives if one drive is subjected to a predetermined overload, and for automatically interrupting all of said drives if the overload on one drive exceeds a predetermined maximum.

Other objects and advantages will become apparent as the description proceeds.

In the accompanying drawings, Figure 1 is a perspective view of a machine embodying the features of my invention.

Fig. 2 is a diagrammatic representation of the electrical control for the rotative drives.

Fig. 3 is a diagrammatic representation of the electrical control for the translatory drives.

Fig. 4 is a fragmentary diagrammatic representation of a modified form of control for both drives.

Fig. 5 is an elevational view on an enlarged scale of a movable switch panel.

Fig. 6 is a front elevational view on an enlarged scale of a stationary switch panel.

Fig. 7 is a fragmentary plan view of the machine.

Fig. 8 is a fragmentary vertical sectional view of the machine taken substantially along line 8—8 of Fig. 7.

Fig. 9 is a fragmentary elevational view of the machine and particularly of the support for the movable panel.

Fig. 10 is a fragmentary plan view of the construction illustrated in Fig. 9.

Figure 1:
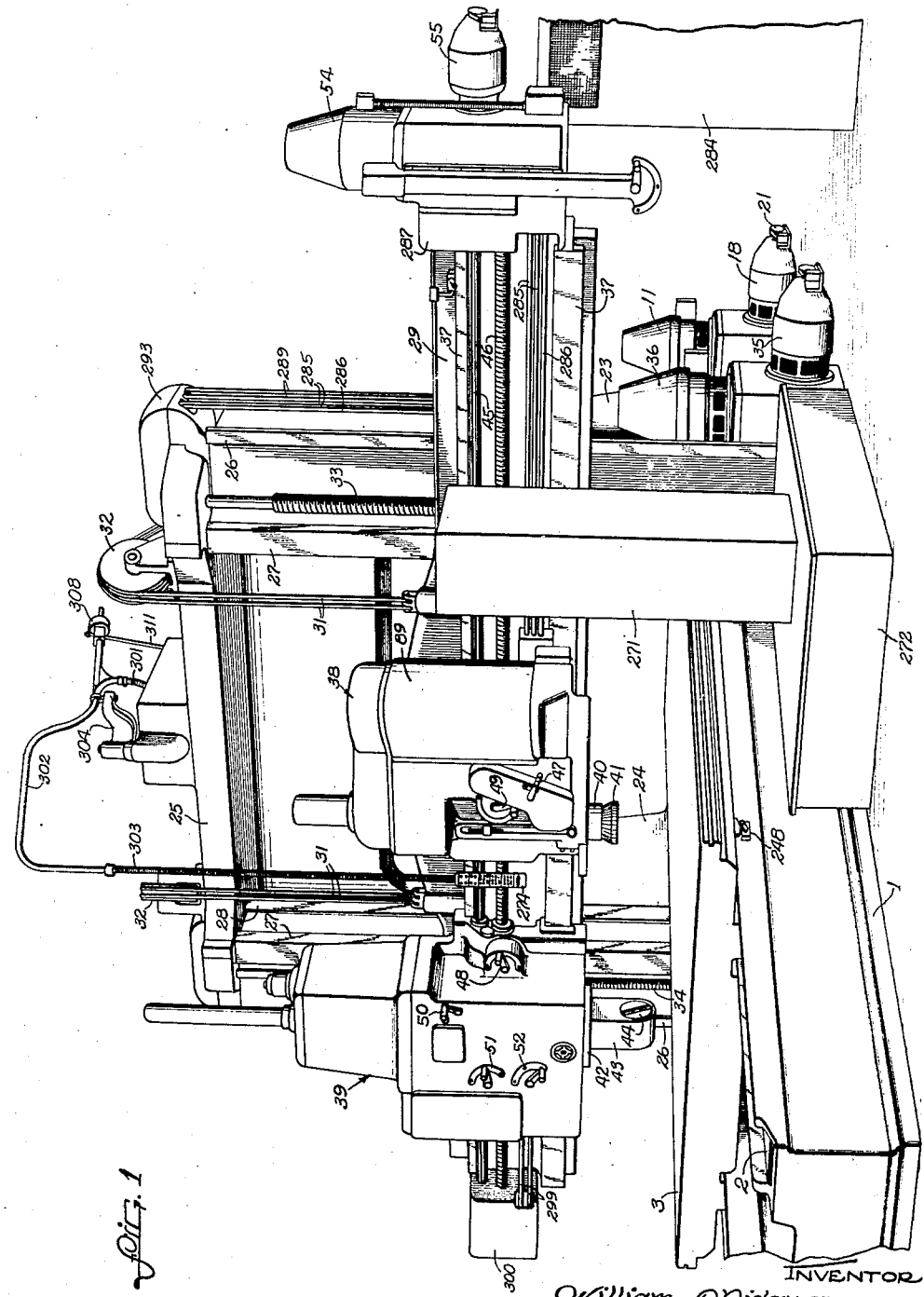

The features of the present invention may be embodied in various types of machine tools for performing different metal removing processes, and are particularly suitable for single or multiple purpose machines having one or more translatory elements and one or more power driven spindles. For purposes of illustration, the invention in its preferred form is herein disclosed as embodied in a so-called cross-rail milling machine. It is to be understood, however, that the invention is not limited to the specific form or environment disclosed, but embraces all modifications, adaptations and alternative constructions coming within the spirit and scope of the appended claims.

*General machine structure*

The machine (see Fig. 1) comprises an elongated horizontal bed 1 which is formed on the top with parallel spaced longitudinal ways 2. A table 3 is mounted for reciprocation on the ways 2, and is adapted to be driven selectively in either direction at a rapid traverse or at a slow feed. For convenience, movement of the table 3 forwardly or to the left in Fig. 1 will be designated as the "out" movement, and the reverse movement will be referred to as the "in" movement.

The drive means may be of any suitable type or form, and is herein shown (see Figs. 1 and 3) as comprising a planetary gearing 4 having a central sun gear 5, a plurality of idler gears 6 journaled on a rotatable support 7 and meshing with the sun gear, and an internal gear 8 meshing with the idler gears. The support 7 constitutes the driven element of the gearing 4, and is fixed coaxially on one end of a worm 9 anchored against endwise movement. A longitudinal gear rack 10 on the underside of the table 3 meshes with the worm 9. The internal gear 8 constitutes a driving element of the gearing 4, and is adapted to be driven by an electric feed motor 11 having an armature 12 and a field 13. In the present instance, the armature 12 is connected through a shaft 14 to a worm 15 meshing with a worm wheel 16 integral with the internal gear 8. To obtain a feed movement, the sun gear 5 is stationary, and the table 3 is driven only from the motor 11. When a rapid traverse is desired, the feed drive is supplemented in a differential action by driving the sun gear 5 through a shaft 17 from a rapid traverse motor 18 having an armature 19 and a field 20. Rotation of the sun gear 5 during the feed drive is prevented by a brake 21 normally acting on the shaft 17, and adapted to be released by an electric coil 22 when the rapid traverse drive is instituted.

Two vertical columns 23 and 24 are rigidly mounted at opposite sides of the bed 1, and preferably substantially midway of the ends thereof. The upper ends of the columns 23 and 24 are rigidly connected by a horizontal bridge member 25 spanning the table 3. Spaced parallel vertical ways 26, 27 and 28 are formed on the forward and inner sides of each of the columns 23 and 24. An elongated horizontal cross rail 29, extending traversely of the bed 1, is mounted for translation on the ways 26, 27 and 28, and is adapted to be driven in either direction selectively at a rapid traverse or a slow feed. Two counterweights 30 (see Fig. 7) are suspended respectively within the columns 23 and 24, and are connected to the cross rail 29 at points adjacent the columns by means of cables 31 running over sheaves 32 on the bridge member 25.

The drive means for the cross rail 29 preferably comprises two vertical rotary screws 33 and 34 which are anchored at their ends against longitudinal movement and which are positioned respectively between the ways 26 and 27 of the columns 23 and 24. These screws are adapted to be driven in synchronism either at a rapid traverse rate or a slow feed rate by rapid traverse and feed motors 35 and 36.

The front of the cross rail 29 is formed with vertically spaced parallel longitudinal ways 37 on which one or more tool heads may be mounted for translation. In the present instance, two selectively available tool heads 38 and 39 are shown. The head 38 comprises a vertical spindle 40 which is mounted for rotation and axial drive, and which is adapted at its lower end to support a suitable tool, such as an end face milling cutter 41. The head 39 comprises a vertical ram 42 which has a housing 43 on its lower end for a horizontal tool spindle 44, and which is mounted for axial drive, and for rotary adjustment to locate the spindle in different angular positions. Any suitable tool, such as a die-sinking tool (not shown), may be mounted on the spindle 44. Self-contained motor drives (not shown in their entirety) are mounted respectively within the heads 38 and 39 for rotating the spindles 40 and 44.

Power drive means is selectively available for traversing the tool heads 38 and 39 along the cross rail 29, and translating the spindle 40 and the ram 42 axially, either at a rapid traverse or a variable feed. In its preferred form, this means comprises a rotary spline shaft 45 and a stationary screw 46, both of which extend through the tool heads 38 and 39 and are anchored at the ends of the cross rail 29. Enclosed within the heads 38 and 39 are four drive connections (not shown) from the spline shaft 45 and under the control respectively of clutch actuators 47, 48, 49 and 50. The first two connections are adapted to cooperate with the screw 46 respectively to translate the heads 38 and 39. The other two connections respectively include change-speed mechanisms 51 and 52, and provide the axial drives for the spindle 40 and the ram 42. One end of the shaft 45 is adapted to be driven either at a rapid traverse or a variable feed, through a planetary gearing similar to the gearing 4 and a change-speed mechanism 53, from feed and rapid traverse motors 54 and 55.

*Master control*

The machine comprises an electric control system for the various translatory and rotative drives. The system consists of individual sets of control circuits for the three translatory drives and the two rotative drives, three sources of electric current of different potential common to all of the sets of control circuits, and a master switch 56 for rendering the system as a whole operative. Each set of control circuits comprises motor circuits adapted to be connected across the source of highest potential, for example 230 volts, primary relay circuits adapted to be connected across the source of intermediate potential, for example 115 volts, and secondary relay circuits adapted to be connected across the source of lowest potential, for example 12 volts. The high potential source for the motor circuits makes it possible to use large and powerful motors for effectual actuation of the heavy machine tool elements. The use of an intermediate potential source of energy for actuation of the primary relay circuits insures effective operation of the relatively heavy switches, which are utilized to control the main energizing circuits, while the use of low potential secondary relay circuits makes it possible to utilize small compact operating switches therefor, as well as small lightly insulated conductors. The use of such low potential control devices as are herein illustrated not only makes possible a light compact control device but also protects the operator against dangerous or harmful shocks in the event that he touches any of the low potential circuit divices.

Preferably, direct current is employed. Current from the high potential source is available across main lines 57 and 58. The intermediate potential source has main lines 59 and 60 of which the former is adapted to be connected to a line 61 by the master switch 56. The low potential source comprises a generator 62 having a field 63 connected across the lines 59 and 60, and having main lines 64 and 65 of which the former is adapted to be connected by manually operable switches 66 and 66ª respectively for the rotative and translatory drives either to a line 67 or a line 67ª. A voltmeter 68 is connected across the lines 64 and 65. The generator 62 is adapted to be driven by a motor 69 having a shunt field 70 and adapted to be connected across the lines 57 and 58 by a switch 71 when the switch 66 is closed. The switches 66, 66ª and 71 have a common actuator 72.

The master switch 56 is under the control of a manually operable normally open reset switch 73, and is operable by an actuating coil 74 for temporarily closing a switch 75, and a sealing coil 77 for closing switches 78 and 79. Upon closing the switch 73, a circuit is completed from the line 59, through the switch 73, a line 80 and the coil 74 to the line 60. Thereupon, the switch 75 is closed to complete a circuit from the line 59, through the switch 75, a line 81, a safety switch 82 normally held closed by a coil 83 connected across the lines 57 and 58, a line 84 including a series of normally closed manually operable stop switches 85, 86, 87 and 88 and the coil 77 to the line 60. Upon excitation of the coil 77, the switch 78 connects the lines 59 and 61, and the switches 78 and 79 shunt the sealing circuit across the switch 75. It will be evident that the master switch 56 will not close unless current is available across the lines 57 and 58, and if closed will open upon opening any one of the stop switches 85 to 88. It will be noted that the safety switch 82 and the motor generator set 69—62 form an effective electrical interlock between the three supply mains. Thus, as was pointed out above, the intermediate potential supply main is open circuited by the switch 82 unless a predetermined high voltage is supplied to the high potential mains 57—58, and low potential current is only supplied to the mains 64—65 when the generator 62 is driven by the motor 69 which is, in turn, energized from the high potential mains 57—58.

*Control circuits for spindle drives*

The two sets of control circuits for the spindle rotative drives are alike, and connected in parallel across the various current supply lines 57 and 58, 59 and 60, and 64 and 65, and hence a description of the circuits for the spindle 40, illustrated in Fig. 2, will suffice for both.

The spindle 40 is adapted to be rotated in either direction and at different selected speeds from a motor 89 enclosed within the head 38. The motor 89 comprises a field 90 connected across the high voltage lines 57 and 58, and an armature 91 adapted to be connected reversely across the power lines either by switches 92 and 93 to effect right hand rotation, or switches 94 and 95 to effect left hand rotation of the spindle 40. The reverse circuits are respectively as follows: from the line 57, through a line 96, the switch 92, a line 97, the armature 91, a line 98, and the switch 93 to the line 58; and from the line 57, through the line 96, the switch 94, the line 98, the armature 91, the line 97 and the switch 95 to the line 58.

A coil 99 in the line 96 is arranged to open a normally closed switch 100 in the line 84 to open the master switch 56 in the event of a predetermined maximum overload on the motor 89.

The switches 92 to 95 are normally open, and are adapted to be closed respectively by actuating coils 101 to 104. Exciting circuits for these coils are adapted to be closed selectively across the lines 61 and 60 by a relay selector switch 105 under the control of a two-way switch 106 and a start or run switch 107. The selector switch 105 comprises two independently excitable coils 108 and 109 adapted respectively to close two switches 110 and 111 in the circuit for the coils 101 and 102 and two switches 112 and 113 in the circuit for the coils 103 and 104. Upon closing the switch 107, a circuit will be completed from the low voltage line 61, through the switch 107, a line 114, and an actuating coil 115, operable upon energization to close a switch 116, to the line 65. Assuming the switch 106 to be adjusted for right-hand spindle rotation, the switch 116 thereupon will complete a circuit from the main line 61 through the coil 108, a line 117, the switch 106, a line 118, the switch 116, a line 119, and a normally closed stop switch 120 to the line 60. Upon excitation of the coil 108, the switches 110 and 111 complete a circuit from the line 61, through the switches 110 and 111 in parallel, and the coils 101 and 102 in parallel to the line 60, thereby effecting a closing of the circuit for the armature 91.

However, if the switch 106 is adjusted for left-hand spindle rotation, the circuit closed by the switch 107 will follow a parallel path from the line 61 through the coil 109, a line 121 and the switch 106 to the line 118. Upon excitation of the coil 109, the switches 112 and 113 complete a circuit from the line 61 through the coils 103 and 104 in parallel to the line 60.

Also operable respectively by the coils 102 and 103 are two sealing switches 122 and 123, each of which is connected in parallel with the run switch 116 across the lines 118 and 119 so that when the control circuit is established through one or the other of the coils it will be maintained after the switch 107 is opened.

The armature control circuit including the coils 101 and 102 or the coils 103 and 104 may be interrupted at will to stop the motor 87 by opening the switch 120. The latter is normally closed, and is adapted to be opened by a coil 124 upon closing a manually operable stop switch 125 to complete a circuit from the line 67, through the switch 125, a line 126, and the coil 124 to the line 65.

The rate of spindle rotation is subject to a finely graduated adjustment by a rheostat 127 interposed in the circuit for the field 90. The rheostat arm 128 is operable by a motor 129 having an armature 130 and two series fields 131 and 132 selectively available and adapted to effect rotation in opposite directions. Two manually operable switches 133 and 134 are available selectively to connect two coils 135 and 136 respectively across the lines 61 and 65. The coils 135 and 136 are adapted upon excitation to close switches 137 and 138 in the circuits for the fields 131 and 132. Hence, upon closing the switch 137, a circuit will be completed from the line 61, through the switch 137, a line 139, the field 131, a line 140, and the armature 130 to the line 60 to effect rotation of the motor 129 in a direction to increase the spindle speed. Similarly, when the switch 138 is closed, a circuit is completed from the line 61, through the switch 138, a line 141, the field 132, the line 140, and the armature 130 to the line 60 to effect a reduction in the speed of the spindle 40. The approximate rheostat setting is visually indicated at all times by a gauge 142 driven in synchronism with the rheostat arm 128 through a flexible shaft 143 from the motor 129.

To indicate the speed of rotation at all times, a voltmeter 144, calibrated in revolutions per minute, is connected through lines 145 and 146 in a closed circuit with a generator 147 driven by the spindle 40. The generator 147 has an exciting field 148 adapted to be connected across the lines 61 and 60 by a set of reversing switches 149 operable selectively by the coils 108 and 109. Thus, the field 148 is reversed whenever the circuit for the armature 91 is reversed so that the voltmeter 144 will always give a positive reading.

To provide a dual control, a second group of switches 107a, 125a, 133a and 134a is connected in parallel with the switches 107, 125, 133 and 134. The parallel connection for the switches of the second group includes the common inlet line 67a. Thus, either group of switches may be rendered selectively available by adjusting the switch 66 to connect one or the other of the lines 67 and 67a to the line 64.

Control circuits for translatory drives

The three sets of control circuits for the translatory drives also are alike and connected in parallel across the various current supply lines 57 and 58, 59 and 60, and 64 and 65, and hence a description of the circuits for the table 3, illustrated in Fig. 3, will suffice for all.

The exciting fields 13 and 20 of the motors 11 and 18 are always connected across the high voltage lines 57 and 58, one end of the field 13 being connected to the line 57 through a line 150 and a rheostat 151 with an adjustable arm 152.

The circuit for the armature 12 of the motor 11 is adapted to be completed in one direction, to effect the "out" movement of the table 3, from the line 57, through a switch 155, a line 153, the armature 12, a line 154, a switch 156, and a starting resistance 58a to the line 58, and in the reverse direction, to effect the "in" movement of the table, from the line 57, through a switch 157, the line 154, the armature 12, the line 153, a switch 158, and the resistance 58a to the line 58. Similarly, the circuit for the armature 19 of the rapid traverse motor 18 is adapted to be completed reversibly for the "out" and "in" movements of the table 3, either from the line 57, through a switch 161, a line 159, the armature 19, a line 160, and a switch 162 to the line 58, or from the line 57, through a switch 163, the line 160, the armature 19, the line 159, and a switch 164 to the line 58.

The feed switches 155 to 158 and rapid traverse switches 161 to 164 are normally open, and are adapted to be closed selectively upon the respective excitation of coils 165 to 172. Exciting circuits for these coils are adapted to be closed selectively across the lines 61 and 60 by a relay selector 173 under the control of a selector switch 174, and a run switch 175 or a traverse switch 176. The selector 173 comprises two independently excitable coils 177 and 178 adapted respectively to close a switch 179 in the circuit for the coils 165, 166, 169 and 170, and a switch 180 in the circuit for the coils 167, 168, 171 and 172. When the selector switch 174 is adjusted for "out" or forward movement of the table 3, it completes a circuit from the line 67, through the switch 174, a line 181, and the coil 177 to a line 182. In its other position of adjustment, the switch 174 completes a circuit from the line 67, through the switch 174, a line 183, and the coil 178 to the line 182. The line 182 is adapted to be connected to the line 65 when either of the spindles 40 and 44 is operating, for example through either of two switches 184 and 185 (Fig. 2) upon excitation respectively of the coils 101 and 104. Thus, the switches 184 and 185 constitute an interlock between the spindle drives and the translatory drives.

Upon closing the "run" switch 175, a circuit is completed from the line 67, through the switch 175, a line 186, a normally closed switch 187 adapted to be energized upon excitation of a stop coil 188, a line 189 and a "run" coil 190 to the line 182. A parallel circuit is closed simultaneously from the line 189, through a normally closed switch 191 adapted to be opened upon excitation of a "jog" coil 192, a line 193 and a sealing coil 194 to the line 182. Excitation of the coils 190 and 194 serves to close three switches 195, 195a, and 196. Assuming that the selector 173 has closed the switch 179, closing of the switch 195 completes a circuit from the line 61, through the switch 195, a line 197, the coils 165 and 166, a line 198, and the switch 179 to the line 60, thereby instituting a slow "out" feed. If, on the other hand, the switch 180 is closed, the circuit will proceed in a parallel path from the line 197, through the coils 167 and 168, a line 199, and the switch 180 to the line 60, thereby instituting a slow "in" feed. In each instance, the switches 195a and 196 are closed. The switch 196 closes a sealing circuit for the coil 190, from the line 67, through the switch 174, either the line 181 and a normally closed interlock switch 200 adapted to be opened by the coil 178 or the line 183 and a normally closed interlock switch 201 adapted to be opened by the coil 177, a line 202, the switch 196, the line 196a, the line 186, the switch 187, the line 189, and the coil 190 to the line 182. The switch 195a completes a circuit from line 202, the closed switch 196, the line 196a, the line 186, the switch 187, the switch 195a, a coil 213a, and a normally closed switch 213 under the control of the coil 192, to line 182. The coil 213a controls a normally open switch 213b adapted to be closed against the action of a dash pot 213c to short-circuit the starting resistance 58a. When the coil 213a is energized, the switch 213b therefore will close after a short time interval to permit the motor 11 to accelerate to normal speed.

Upon closing the traverse switch 176, a circuit is closed from the line 67, through the switch 176, a line 203, and a traverse coil 204 to the line 182. The coil 204 serves to close two switches 205 and 206. The switch 205 serves to close a circuit from the line 61, through the switch 205, and a line 207, either through the coils 169 and 170, the line 198, and the switch 179, or through the coils 171 and 172, the line 199 and the switch 180, to the line 60. The switch 206 closes a circuit from the line 61, through the switch 206, a line 207a, and the solenoid 22 to the line 60, to release the brake 21. Thus, as long as the traverse switch 176 is held closed, the motor 18 will operate. If the "run" switch 175 has been closed, the motor 11 also will operate, and the two motors will drive the table 3 at a rapid traverse.

Operation of the motor 11 may be speeded up by closing a fast feed switch 208 to complete a circuit from the line 67, through the switch 208, a line 209 and a coil 210 to the line 182. Upon excitation, the coil 210 opens a switch 211 and closes a switch 212. The switch 211 normally is closed, and completes a circuit from the line 57, through a line 214, and the rheostat arm 152 to cut out a portion of the resistance in the circuit for the field 13. When the switch 211 is opened and the switch 212 is closed, this circuit is interrupted, and a parallel circuit is closed from the line 57, through a line 215 to increase the field resistance to effect a more rapid feed. It will be noted that the fast feed switch 208 is ineffective to establish a maintaining circuit and consequently, must be held in its closed position to effect rapid feed movement of the machine element which it controls. This arrangement is particularly advantageous since the attention of the operator is directed to the high speed feed movement of the machine element by the necessity of manually maintaining the switch 208 in its closed position.

An additional manually operable "jog" switch 216 in parallel with the switch 175 is also available for effecting excitation of the "run" coil 190, but is ineffective to establish a maintaining circuit. When the switch 216 is closed, a circuit is completed from the line 67, through the switch 216, a line 217, and the jog coil 192 to the line 182. Upon excitation, the coil 192 opens the switch 191 in the circuit for the sealing coil 194, and closes a switch 218 to connect the lines 202 and 186, thereby completing the circuit for the coil 190. The coil 192 also closes a switch 219 to connect the line 57 across the rheostat 151 directly to the line 150, and opens the switch 213 to permit the resistance 58ª to remain in the line 58, thereby effecting a very slow operation of the feed motor 11.

Thus, operation may be instituted by closing the "run" switch 175, the "traverse" switch 176, or the "jog" switch 216. The sealing circuit is closed only when the switch 175 is actuated. The switches 176, 208 and 216 must be maintained closed as long as a rapid traverse, a fast feed and a jog feed respectively are desired. The sealing circuit for the "run" coil 190 may be interrupted at will to stop the normal feed by momentarily closing a manually operable "stop" switch 220 to complete a circuit from the line 67, through the switch 220, a line 221, and the coil 188 to the line 182, thereby opening the switch 187.

The normal rate of feed of the table 3 is subject to adjustment by varying the resistance in the circuit for the motor field 13. To this end, the rheostat arm 152 is adapted to be driven in either direction by a shaft 222 operable from a motor 223. The latter has an armature 224 and two series fields 225 and 226 selectively available and adapted to effect rotation in opposite directions. The circuits for the fields 225 and 226 are adapted to be closed respectively by normally open switches 227 and 228 having actuating coils 229 and 230 under the control of manually operable switches 231 and 232. When the switch 231 is closed, a circuit is completed from the line 67, through the switch 231, a line 233, and the coil 229 to the line 65. The switch 227 thereupon closes a circuit from the line 61, through the switch 227, the field 225, and the armature 224 to the line 60 to effect operation of the motor 223 in a direction to reduce the resistance in the circuit of the field 13, and thereby to reduce the speed of the table 3. The switch 232 is similarly available to close a circuit from the line 67 through the switch 232, a line 234, and the coil 230 to the line 65. Upon excitation of the coil 230, the switch 228 is actuated to close a circuit from the line 61, through the switch 228, the field 226 and the armature 224 to the line 60, and thereby to effect an increase in the table speed. The approximate rheostat setting is indicated at all times by a gauge 235 driven in synchronism with the rheostat contact arm 152 through a flexible shaft 236 from the motor 223.

To indicate the rate of feed at all times, a voltmeter 237, calibrated in inches of feed per minute, is connected through lines 238 and 239 in a closed circuit with a generator 240 driven from a feed change gearing 241 interposed in the shaft 14 between the motor 11 and the worm 15. The generator 240 has a field 242 adapted to be connected across the lines 61 and 60 by a reversing switch 243 which is operable by the coils 177 and 178 to reverse the field 242 whenever the field 13 of the feed motor 11 is reversed so that the voltmeter 237 will always give a positive reading.

To provide a dual control, a second group of switches 175ª, 176ª, 208ª, 216ª, 220ª, 231ª and 232ª is arranged in parallel with the group of switches 175, 176, 208, 216, 220, 231 and 232. These two groups of switches may be rendered selectively available by actuating the switch 66 to connect one or the other of the lines 67 and 67ª to the line 64.

Means is provided for automatically interrupting the operation of the machine upon movement of the table 3 into either of its extreme end positions. This means comprises two limit switches 248 and 249 interposed respectively in the lines 183 and 181. Both limit switches are normally closed, and are mounted adjacent opposite ends of the bed 1 for actuation by the table 3. Movement of the table 3 into its extreme "in" and "out" positions will open the switches 248 and 249 respectively to deenergize the coil 177 or 178. The uninterrupted line will, however, permit initiation of table travel in the reverse direction.

In the event of a small predetermined overload on the spindles 40 and 44, a switch 252 (Fig. 2) is closed by a coil 253 in the line 96 to complete a circuit across the lines 61 and 60 through a signal device, such for example as an electric lamp 254. Should the overload exceed a still higher predetermined value, a switch 255 will be closed by a coil 256 in the line 96 to complete a circuit from the line 57 directly to the line 150, thereby shunting the entire resistance in the circuit for the field 13 of the motor 11 to reduce the speed of the table 3. If the overload exceeds a maximum predetermined limit, the switch 100 will be opened by the coil 99 to stop the machine.

In a modified form of the invention (see Fig. 4), a single voltmeter 257 performs the functions of the indicator 235 and the voltmeter 237. The voltmeter 257 indicates the rheostat setting during idle periods of the machine, and the rate of travel of the table 3 during working periods. To this end, a contact arm 258 is adjustable along a potentiometer 259 by the motor 223 in synchronism with the rheostat arm 152. The circuits are under the control of three normally closed switches 260, 261 and 262, and two normally open switches 263 and 264, adapted respectively to be opened and closed upon excitation of the sealing coil 194. Thus, when the coil 194 is deenergized, the switch 260 connects the potentiometer 259 across the lines 61 and 60, and the switches 261 and 262 complete a circuit from the voltmeter 257, through a line 265, the switch 261, the contact arm 258 and a portion of the potentiometer 259 and a line 266 back to the voltmeter. It will be evident that the voltmeter 257 will indicate the setting of the arm 258 and therefore that of the arm 152. A signal lamp 267 is connected in parallel with the potentiometer 259, and indicates when the voltmeter 257 is registering the rheostat setting.

When the sealing coil 194 is excited, for example during normal feed or fast feed, the switches 260, 261 and 262 are opened to interrupt the circuits for and through the potentiometer 259, and the switches 263 and 264 are closed to connect the lines 265 and 266 with lines 268 and 269, thereby connecting the generator 240 in a closed circuit with the voltmeter 257. The signal lamp 267 now is out, and the voltmeter 257 indicates the approximate rate of feed of the table 3.

It will be understood that the rheostat settings and the operating speeds for the other translatory and rotative drives may be indicated in a similar manner. For the rotative drives, the indicator circuits would be controlled by adding a sealing coil to replace the maintaining switches 122 and 123.

Mounting and housing for controls

From the foregoing, it will be evident that each of the rotative and translatory drives comprises a dual set of control switches, an indicator for the rheostat setting and a voltmeter for indicating the speed of operation. The control switches of each set may be of any suitable character, and are herein illustrated as of the push button type, and as assembled in conveniently spaced and arranged relation in a distinct group. Thus, for the spindle 40, the switches 106, 107, 125, 133 and 134 are mounted in a compact group on a panel 270 (see Fig. 6) forming part of a stationary cabinet 271 on an operator's platform 272, and the dual switches 107a, 125a, 133a and 134a are similarly mounted on a panel 273 (see Fig. 5) forming part of a small movable pendant 274. The indicator 142, the voltmeter 144 and the signal lamp 254 are mounted on the panel 270 respectively at opposite sides of and over the group of stationary switches. The corresponding parts for the spindle 44, identified generally by the reference characters 275 and 275a, are similarly mounted and arranged on the panels 270 and 273.

Similarly, for the table 3, the switches 174, 175, 176, 208, 216, 220, 231 and 232 are mounted in a compact group on the stationary panel 270, and the dual switches 174a, 175a, 176a, 208a 216a, 220a, 231a and 232a are mounted in a similar group on the movable panel 273. The indicator 235 and the voltmeter 237 are mounted on the panel 270 respectively at opposite sides of the group of stationary switches. The corresponding parts for the rail 29 and the translatory drive for the heads 38, 39, the spindle 40 and the ram 42, identified respectively by the reference characters 276 and 276a, and 277 and 277a, are similarly mounted and arranged.

The stop switch 85 is mounted on the movable panel 273. The stop switches 86, 87 and 88 are mounted on the panel 270 respectively in associated relation with the stationary control switches for the head and ram drive, the table drive, and the rail drive. Also mounted on the stationary panel 270 are the selector switches 66 and 66a for transferring the control from the stationary panel 270 to the movable panel 273 or vice versa, the reset switch 73, and a coolant control 278.

One of the important features of the invention resides in the provision of visual indicators on the panels 270 and 273 in association with the respective groups of control switches thereon to facilitate selection and operation of the proper switches, and particularly to avoid confusion on the part of the operator upon transfer of attention from one panel to the other. The indicators may be of any suitable character, but preferably consist of various groups of parallel lines, defined by grooves or painted stripes and orientated for the translatory drives to indicate the direction of travel of the associated machine elements. Also, the indicators for each set of dual controls for each drive are alike to permit ready identification and comparison.

The dual controls for each drive are provided respectively with three sets of visual indicator lines of which two sets are located respectively between the switch actuators on the panels 270 and 273, and one set is provided on the dial of the associated rheostat indicator. Thus, three sets of horizontal lines 279, 279a and 279b are provided for the dual controls for the spindle 40, three sets of vertical lines 280, 280a and 280b are associated with the controls 275 and 275a for the spindle 44, three sets of horizontal lines 281, 281a and 281b serve the controls for the table 3 and indicate the plane of travel thereof, three sets of vertical lines 282, 282a and 282b are associated with the controls 276 and 276a and indicate the direction of travel of the rail 29, and three sets of vertical and horizontal cross lines 283, 283a and 283b are associated with the controls 277 and 277a and indicate the direction of travel of the heads 38 and 39, the spindle 40 and the ram 42. It will be noted that the horizontal and vertical lines for the different sets of controls are substantially spaced from each other on the panels 270 and 273.

In operation, if the drive for the spindle 40 is being controlled from the panel 270, and the control is shifted to the panel 273 by reversing the switch 66, the indicator 279a, being the same in form and general location as the indicator 279, will direct the operator's attention immediately to the proper switch actuators on the panel 273. The transfer of the control from one panel to the other for any one or more of the other drives is similarly facilitated.

The high voltage lines are housed mainly in a cabinet 284 remote from the machine. The intermediate and low voltage lines are enclosed mainly within the cabinet 271. Only certain low and intermediate voltage switches are mounted in the pendant 274. Hence, the pendant 274 can be made small and compact to facilitate ready and convenient manipulation thereof.

The leads from the pendant 274 and the various drive motors on the machine to the cabinets 271 and 284 are concealed to a large extent, and where not concealed are protected and located out of the way. Thus, the leads for the table and cross rail drive motors 11, 18, 35 and 36 are located beneath the body of the machine and the platform 272 or buried in the foundation.

The leads from the headstock 38 for the motor 56 are enclosed within two cables 285 which together with a cable 286 for a coolant extend along the front of the cross rail 29 to a housing 287 (see Figs. 1 and 7) on one end of the latter wherein they run over a pulley 288. The leads for the drive motors 54 and 55 are enclosed within two cables 289 which together with the cables 285 and 286 from the pulley 288 run over a pulley 290, then from the housing along the rear of the cross rail 29 (see Figs. 7 and 8), then over a pulley 291 mounted in a bracket 292 on one side of the column 23, then vertically and over a pulley 292 mounted within a housing 293 on the top of the column, and then downwardly within the column about a suspended pulley 294 supporting a counterweight 295 and upwardly to a bracket 296 where they are rigidly anchored. Separable sections of the conduits 285, 286 and 289 lead from the bracket 296 downwardly along the exterior of the column 23 between the ways 27 and 28, the conduit 286 being connected to the outlet of a coolant pump 297 operable by a motor 298 subject to the control 278, and the conduits 285 and 289 continuing with the leads from the motors 11, 18, 35 and 36 to the cabinets 271 and 284.

The leads and coolant line for the headstock 39 are enclosed within two cables 299 which extend along the cross rail 29 to a pulley box 300, and then are guided along the column 24 in a similar manner (not shown) to the base of the machine and the cabinets 271 and 284.

The cables therefore follow the general contour of the machine, and are always taut regardless of the position of the cross rail 29 or either of the headstocks 38 and 39. The arrangement is such that the cables 285, 289 and 299 are of the same length so that only a small number of extra cables for repair purposes need be kept on hand.

For the convenience of the operator, the pendant 274 is mounted for adjustment over a wide range both horizontally and vertically. Preferably, the adjustment is such that the pendant 274 will always be positioned substantially the same distance from the front of the cross rail 29 so as not to get in the way of the operator nor interfere with the cross rail and heads 38 and 39. In the present instance, the pendant 274 is suspended from the forward end of a rigid generally horizontal conduit 302 by a flexible conduit 303. A cable 301 is attached to the conduit 302 so that the leads therein are directed through the latter and the conduit 303 to the pendant 274. The conduit 302 (see Figs. 9 and 10) is mounted intermediate its ends, for horizontal and vertical pivotal movements, on the free end of a rearwardly extending arm 304 supported at its forward end by a vertical pivot connection 305 on the bridge member 25.

Rigidly connected to the conduit 302 and constituting a rearward extension thereof is an arm 306 formed with a pivot block 307 and supporting a counterweight 308 on its free end. A ball 309 is journaled on horizontal trunnions 310 extending transversely of the arm 306 within the block 307, and is freely slidable on a generally vertical rod 311 connected at its lower end to the bridge member 25 for pivotal movement about a horizontal axis parallel to that of the ball.

Since the forward end of the conduit 302 defines a long radius, the pendant 274 will be adjustable vertically in an approximately straight line. Horizontal adjustment of the pendant 274 will swing the conduit 302 laterally about 274. The arm 304 will thereupon cause the pivotal support for the conduit 302 to be so adjusted that the horizontal movement of the pendant 274 will also be along an approximately straight line.

Brief résumé of operation

In starting the machine, the reset switch 73 on the panel 270 is closed temporarily. Thereupon, the master switch 56 is closed permanently to establish the connection between the lines 60 and 61.

The machine may be controlled from the panel 270 or the panel 273 by adjusting the switches 66 and 66a to connect the line 64 either to the line 67 or the line 67a. The direction of each drive is adapted for independent control. For example, the rotation of the spindle 40 is under the control of the switch 106 on the panel 270. Similarly, the direction of travel of the table 3 may be reversed by means of the switch 174 on the panel 270 or the switch 174a on the panel 273.

Assuming that the control is from the stationary panel 270, the rotative drive for the spindle 40 may be set into operation by closing the switch 107, and may be interrupted by closing the switch 125. The speed of rotation may be increased or decreased respectively by holding the switch 133 or the switch 134 closed until the voltmeter 144 indicates the desired speed. The corresponding rheostat setting is indicated by the gauge 142. When the control is shifted to the panel 273, the switches 107a, 125a, 133a and 134a are available for the same functions. The rotative drive for the spindle 44 is similarly controlled from the groups of switches 275 and 275a.

Assuming that one of the spindles 40 and 44 is in operation, translation of the table 3 may be instituted by closing either the run switch 175, the jog switch 216 or the traverse switch 176, and may be stopped by closing the switch 220. A maintaining circuit is established when the switch 175 is closed. The fast feed, jog and rapid traverse are effected only while the respective switches 208, 216 and 176 are closed. The rate of feed may be adjusted by closing either the switch 231 or the switch 232 until the voltmeter 237 indicates the desired feed. The corresponding rheostat setting is indicated by the gauge 235. When the control is shifted to the panel 273, the switches 175a, 176a, 208a, 216a, 220a, 231a and 232a are available. The controls 276 and 276a, and 277 and 277a are similarly available for the other translatory drives.

If the table 3 is moved beyond either of its end positions, the circuit to the coil 177 or 178 will be interrupted to stop the operation of all of the machine elements. If the load on either of the spindles 40 and 44 exceeds a predetermined amount, a danger signal will be flashed. If either of the spindles is subjected to a still higher predetermined overload, the rate of feed of the translatory elements will be automatically reduced. If the overload on either spindle exceeds a predetermined maximum the master switch 56 will open automatically to stop the operation of the machine. The machine may also be stopped manually by opening either of the switches 66, 85, 86, 87 and 88.

I claim as my invention:

1. A machine tool comprising, in combination, an operative machine tool element, an electric motor for driving said element and including an armature circuit with reversing switches, a high potential supply main for said circuit, a plurality of primary coils for actuating said switches, an intermediate potential supply main, direction switches for controlling the relative connection of said coils to said last mentioned main, a low potential supply main, a plurality of secondary coils for actuating said direction switches, and control switches for connecting said secondary coils selectively across said low potential main.

2. A machine tool comprising, in combination, a movable machine tool element, electric motor driving means for said element having a field circuit and an armature circuit, a high potential source of current for energizing said circuits, magnetic reversing switches for controlling the application of current to said armature circuit, magnetically operated switching means controlling the degree of energization of said field circuit to determine the speed of movement of said element, a low potential source of current, a panel remote from said electric motor driving means, and a compact group of control switches on said panel for controlling the energization of said magnetic switches and switching means from said low potential current source.

3. A machine tool comprising, in combination, an operable machine tool element, a stationary panel, a movable panel adapted to be moved about the machine by the operator as he inspects the operation of said element, an electric drive for said element and including two alternatively available sets of control switches mounted respectively on said panels, and means available at will for selectively rendering one or the other of said set in control of said drive.

4. A machine tool comprising, in combination, an operable machine tool element, a stationary panel, a movable panel, an electric drive for said element and including two selectively available parallel connected sets of control switches mounted respectively on said panels, and like identifying indicia associated with said sets of switches for indicating the positions of the corresponding control devices in said sets and thereby facilitating shifting of the control of the operation of said element from one panel to the other.

5. A machine tool comprising, in combination, a bed, a table element reciprocable on said bed, two spaced columns rising from said bed, a cross-rail element mounted for vertical translation on said columns, a head element mounted for translation on said cross-rail element, a spindle element mounted for translation on said head element and for rotation, a rotary electric drive for said spindle element, a plurality of translatory electric drives respectively for said elements, and two dual selectively available controls for said drives mounted on two separate panels, each control including a group of control devices mounted on said panels for each drive.

6. A machine tool comprising, in combination, an operative machine tool element, an electric motor for driving said element and including a speed control circuit, an adjustable rheostat in said circuit, a reversible electric motor for adjusting said rheostat, means including a gauge operatively connected to said last mentioned motor for indicating the setting of said rheostat, and means responsive to the speed of said first mentioned motor for indicating the rate of drive of said element.

7. A machine tool comprising, in combination, an operative machine tool element, an electric motor for driving said element and including a speed control circuit, an adjustable rheostat in said circuit, a reversible electric motor for adjusting said rheostat, and electric means automatically operable when said first mentioned motor is idle for indicating the setting of said rheostat, and when said first mentioned motor is operative for indicating the rate of drive of said element.

8. A machine tool comprising, in combination, a movable machine tool element, an electric motor for driving said element and including an armature circuit, a normally open switch means in said armature circuit, means including a master switch having a sealing circuit for controlling said switch in said armature circuit, a normally closed magnetically operable stop switch in said sealing circuit, and means including a coil in said armature circuit for opening said stop switch when the load on said motor exceeds a predetermined maximum and thereby break the sealing circuit of said master switch to open the same and in turn permit opening of said normally closed switch to stop said motor.

9. A machine tool comprising, in combination, a rotary element, a translatory element, individual electric driving mechanisms for respectively rotating and translating said elements, individual control means for selectively varying the speed of each of said driving mechanisms, and an electric interlock between said driving mechanisms for automatically adjusting one of said control means to decrease the speed of the associated element when the load on the other element exceeds a predetermined value.

10. A machine tool comprising, in combination, a movable machine tool element, an electric motor for driving said element and including a speed control circuit, means including an adjustable rheostat in said circuit for selectively varying the feed rate of said element, an electric motor for adjusting said rheostat, means available at will for shunting said rheostat to decrease said feed rate to a minimum value, and means available at will for shunting a predetermined portion of the resistance in said rheostat to decrease said feed rate to an intermediate value.

11. In a machine tool, in combination with a support, an elongated arm having a universal pivot connection with said support, said connection being freely translatable in one plane and constrained against movement out of said plane, a control member supported on said arm, and a second universal pivot connection between said arm and said support and constrained for translation in a plane perpendicular to said first mentioned plane, whereby said arm is adapted for swinging movement on a long radius in one direction about said last mentioned pivot connection and for swinging movement in a perpendicular direction about said first mentioned pivot connection, and whereby said last mentioned pivot connection is operative to translate said first mentioned pivot connection to modify the path of said member during said last mentioned swinging movement.

12. In a machine tool, in combination with a support, an elongated arm having a universal pivot connection with said support, said connection being freely translatable in one plane and constrained against movement out of said plane, a control member supported on said arm, and means for automatically shifting said connection in accordance with the swinging movement of said arm in one direction about said connection to modify the path of said member.

13. In a machine tool, in combination, an elongated horizontal support, an elongated generally horizontal arm extending transversely of and to the front of said support, means defining a vertical pivot connecting the rear portion of said arm to said support and adjustable in a plane compact flexible cable and adapted to carry only a low voltage current for connecting said control devices in circuit relation with said electrically controlled first named control means and thereby electrically isolating said high potential main from said mobile panel while at the same time providing means for effecting accurate and flexible control of said motor from remote points.

22. A machine tool comprising, in combination, a translatory machine tool element, electric motor driving means for said element, a high potential supply main for said driving means, an electrically operable control means for controlling the energization of said driving means to effect selected traversing of said element at a rapid traverse rate and at a feed rate and to effect selective changes in the direction of movement thereof, a mobile manually operable control station for governing the operation of said first named control means and adapted to be readily moved about the machine tool by an operator, said control station including a panel having a plurality of manually operable control devices mounted thereon, and means including a plurality of elongated flexible conductors extending from said mobile panel in the form of a compact flexible cable and adapted to carry only a low voltage current for connecting said control devices in circuit relation with said electrically controlled first named control means and thereby electrically isolating said high potential main from said mobile panel while at the same time providing means for selectively effecting rapid traverse and feed movement of said machine tool element from remote points.

23. A machine tool comprising, in combination, a reciprocable work supporting table, electric motor driving means for said table including two electric motors operatively connected to said table through a differential gear mechanism, a high potential supply main for said electric motors, electrically operable control means for selectively energizing one of said motors to move said table at a feed rate, and for energizing the other of said motors to move said table at a rapid traverse rate, said control means also embodying means for selectively varying the speed and direction of rotation of said second motor to vary the direction and speed of movement of said table, a mobile manually operable control station for governing the operation of said first named control means and adapted to be readily moved about the machine tool by an operator, said control station including a panel having a plurality of manually operable control devices mounted thereon, and means including a plurality of elongated flexible conductors extending from said mobile panel in the form of a compact flexible cable and adapted to carry only a low voltage current for connecting said control devices in circuit relation with said electrically controlled first named control means and thereby electrically isolating said high potential main from said mobile panel while at the same time providing means for effecting an accurate and flexible control of said motors from remote points.

24. A machine tool comprising, in combination, a translatory machine tool element, electric motor driving means for said element, a high potential supply main for said driving means, electrically operable control means for controlling the energization of said driving means to effect selected traversing of said element at a rapid traverse rate and at a relatively slow feed rate and to effect selected changes in the direction of movement thereof, a mobile manually operable control station for governing the operation of said first named control means and adapted to be readily moved about the machine tool by an operator, said control station including a panel having a plurality of manually operable control devices mounted thereon, means including one of said control devices for initiating operation of said driving means and for maintaining the same in operation in response to a momentary actuation of said one control device, means including a second one of said control devices for stopping said driving means in response to a momentary actuation of said second control device, means including a third one of said control devices for energizing said driving means only when said third control device is held in a predetermined position, and means including a plurality of elongated flexible conductors extending from said mobile panel in the form of a compact flexible cable and adapted to carry only a low voltage current for connecting said control device in circuit relation with said electrically controlled first named control means and thereby electrically isolating said high potential main from said mobile panel while at the same time providing means for effecting accurate and flexible control of said driving means from remote points.

25. A machine tool comprising, in combination, a translatable machine tool element, a rotatable machine tool element, individual electric driving means for said elements, a mobile manually operable control station for governing the operation of said driving means and adapted to be readily moved about the machine tool by an operator, said control station including a plurality of push button operated switches mounted thereon in grouped relationship, each of said groups of switches being operatively connected to their respective driving means, and a prominent bar extending across an end portion of said panel for operating a supervisory control switch arranged to de-energize all of said driving means.

26. A machine tool comprising, in combination, an operable machine tool element, electric driving means for said element, a mobile manually operable control station for governing the operation of said driving means and adapted to be readily moved about the machine tool by an operator, said control station including a panel having a plurality of push button operated switches mounted thereon to effect selected variations in the movement of said element, and a prominently positioned operating bar extending substantially across said panel for operating a switch arranged to de-energize said driving means.

27. A machine tool comprising, in combination, an operable machine tool element, means including an electric motor and a speed control circuit therefor for driving said element, an adjustable rheostat in said circuit, means including a reversible electric motor for operating said rheostat, a control panel, a meter mounted on said panel adapted to indicate the rate of translatory movement of said element, manually operable control means mounted on said panel in juxtaposition to said meter for selectively effecting operation of said reversible motor in one direction or the other and to alter the rate of movement of said element, and a second manually operable control means mounted on said panel in juxtaposition to said meter for selectively enertransversely of said support, a control member supported on the forward portion of said arm, and means acting on an intermediate portion of said arm for automatically adjusting the position of said pivot relative to said support in accordance with the swinging movement of said arm to modify the path of said member.

14. In a machine tool, in combination with a support, an elongated arm having a pivotal connection with said support, a control member mounted on said arm for swinging movement about said connection at a predetermined radius, and means for automatically adjusting said connection relative to said support in accordance with said swinging movement to cause the path of said member to approximate a straight line.

15. In a machine tool, in combination with a transverse support, a rearwardly extending lever connected at its forward end to said support for pivotal movement about a vertical axis, a generally vertical rod connected to said support rearwardly of said axis for pivotal movement on a horizontal axis extending longitudinally of said support, a forwardly extending arm having a universal pivot connection with the free end of said lever and a universal pivot connection with said rod, said last mentioned connection being slidable on said rod, a counterweight on the rear end of said arm, and a control for the machine tool flexibly suspended from the forward end of said arm.

16. A machine tool comprising, in combination, a base, a hollow vertical column rising from said base, a horizontal guide member mounted for vertical translation on said column, means for driving said member, a head mounted on the front of said member for horizontal translation and including a spindle, electric drive means in said head for said spindle, electric drive means on said member for said head, a system of electric circuits including a remote control for said electric drive means and two sets of leads extending respectively to said electric drive means, conduits for said leads anchored respectively to said head and member and having an anchor within said column, and a system of pulleys directing the conduits from said head along the front and toward one end of said member, then with the conduits from said last mentioned electric drive means along the rear of said member, then upwardly along said column, then downwardly and upwardly within said column to said anchor, and then to said control, and weight means engaging said conduits within said column to tension said conduits in all positions of said member and said head.

17. A machine tool comprising, in combination, a base, a hollow vertical column rising from said base, a horizontal guide member mounted for vertical translation on said column, means for driving said member, a head mounted on the front of said member for horizontal translation and including self-contained electric drive means, an anchor in said column, a system of electric circuits including a remote control for said electric drive means and including leads extending to said head, a plurality of conduits of equal lengths for said leads and attached to said head and said anchor, a system of guides for directing said conduits along the front and to one end of said member, then inwardly along the rear of said member, and then downwardly and upwardly to form a bight within said column, and weight means suspended from said bight to tension said conduits in all positions of adjustments of said member and said head.

18. A machine tool comprising, in combination, an operative machine tool element, an electric motor for driving said element, a high potential supply main and an intermediate potential supply main, control means actuated by energy from said intermediate potential supply main for connecting said motor to said high potential supply main, a low potential supply main, secondary control means actuated by energy from said low potential supply main for selectively connecting said first named control means to said intermediate potential supply main, and means including an electrical interlock for preventing the actuation of either of said control means in the absence of predetermined minimum voltages on each of said supply mains.

19. A machine tool comprising, in combination, an operative machine tool element, an electric motor for driving said element having a field circuit and an armature circuit, a high potential source of current for energizing said circuits, magnetic reversing switches for controlling the application of current to said armature circuit, magnetically operated switching means controlling the degree of energization of said field circuit to determine the speed of movement of said element, a low potential source of current, a panel remote from said electric motor, a compact group of control switches on said panel for controlling the energization of said magnetic switches and switching means from said low potential source of current, and means including an electrical interlock for preventing the actuation of said magnetic switches and said switching means in the absence of predetermined minimum voltages on each of said supply mains.

20. A machine tool comprising, in combination, an operative machine tool element, an electric motor for driving said element, a high potential supply main and an intermediate potential supply main, a switch having a pair of contacts biased to their open position interposed in one of said supply mains and an operating coil energized from the other of said mains forming an electrical interlock therebetween, control means actuated by energy from said intermediate potential supply main for connecting said motor to said high potential supply main, a low potential supply main, secondary control means actuated by energy from said low potential supply main for selectively connecting said first named control means to said intermediate potential supply main, and a generator for supplying low potential current to said low potential supply main, said generator being driven by a motor energized from one of the other of said supply mains.

21. A machine tool comprising, in combination, an operative machine tool element, electric motor driving means for said element, a high potential supply main for said electric motor, electrically operable control means for controlling the energization of said motor from said high potential supply main to effect selected changes in speed and direction of movement of said machine tool element, a mobile manually operable control station for governing the operation of said first named control means and adapted to be readily moved about the machine tool by an operator, said control station including a panel having a plurality of manually operable control devices mounted thereon, and means including a plurality of elongated flexible conductors extending from said mobile panel in the form of a gizing and de-energizing said first named motor to start and stop said element.

28. A machine tool comprising, in combination, a movable machine tool element, means including an electric motor and a speed control circuit therefor for driving said element, an adjustable rheostat in said circuit, means including a reversible electric motor for operating said rheostat, a control panel, a meter mounted on said panel adapted to indicate the rate of translatory movement of said element, a manually operable control means mounted on said panel in juxtaposition to said meter for selectively effecting operation of said reversible motor in one direction or the other to alter the rate of movement of said element, a second manually operable control means mounted on said panel in juxtaposition to said meter for selectively energizing and de-energizing said first named motor in response to a momentary actuation of said second manually operable control means to start and stop said element, and a third manually operable control means mounted on said panel in juxtaposition to said meter for energizing said first named motor to move said element only when said third control means is manually held in a predetermined position.

29. A machine tool comprising, in combination, an operative machine tool element, electric motor driving means for said element, a control panel, manually operable means mounted on said panel for selectively varying the speed of rotation of said motor to control the rate of movement of said element, an indicating device mounted on said panel in juxtaposition to said manually operable means for indicating when the load imposed on said motor by the operation of said element attains a predetermined overload value, and means responsive to the load imposed on said motor for de-energizing said motor when said load attains a predetermined maximum value.

30. A machine tool comprising, in combination, a translatable machine tool element, electric driving means for said element, an energizing circuit for said electric driving means, means including a manually operable device for initiating energization of said driving means to effect a rapid traverse movement of said element, a second manually operable device for energizing said driving means to effect a relatively slower feed movement of said element and for maintaining such energization in response to a momentary actuation of said second manually operable device, and means including a third manually operable device for maintaining said driving means energized to effect a relatively rapid feed movement of said element only during such time as said third manually operable device is held in a predetermined position.

31. A machine tool comprising, in combination, a movable machine tool element, power actuating means for said element, a normally operable control means for varying the speed of said element within a normal speed range in response to selected settings of said control means, a fast feed control means for initiating operation of said element at a relatively faster rate, and a manually operable selector means for rendering said fast feed control means operative and said normal control means inoperative without disturbing the setting of the latter whereby said element is again operated at a previously selected normal speed corresponding to the setting of said normal control means when the latter is again rendered operative by said selector.

32. A machine tool comprising, in combination, a movable machine tool element, an electric motor for effecting a feed movement of said element, means including a rheostat for varying the speed of said motor within a normal speed range, normal control means for selectively varying the setting of said rheostat, and means operable at will for short-circuiting said rheostat without disturbing the setting thereof to operate said motor at a relatively faster speed whereby said motor is again restored to its previously selected normal operating speed corresponding to the previous setting of said rheostat when the latter is again put in circuit by said last named means.

33. A machine tool comprising, in combination, a movable machine tool element, electric motor driving means for said element having a field circuit and an armature circuit, a high potential source of current for energizing said circuits, magnetic reversing switches for controlling the application of current to said armature circuit, magnetically operated switching means controlling the degree of energization of said field circuit to determine the speed of movement of said element, a low potential source of current, a mobile panel remote from said electric motor driving means and adapted to be readily moved about the machine by an operator, a compact group of control switches on said panel for controlling the energization of said magnetic switches and switching means from said low potential current source, and flexible conductors connecting said control switches and the apparatus controlled thereby.

34. In a machine tool, in combination with a support, an elongated arm, means forming a pivotal connection between said support and said arm for movement of the latter in a generally horizontal plane, a control member mounted on said arm for swinging movement about said connection, and means for automatically adjusting said connection relative to said support in accordance with said swinging movement to cause the effective radius of curvature of the path of said member to increase as the member is moved from a centered position.

35. A machine tool comprising, in combination, a movable machine tool element, electric driving means for said element, an energizing circuit for said electric driving means, a manually operable switch device for energizing said driving means to effect a relatively slow feed movement of said element and for maintaining such energization in response to a momentary actuation of said manually operable switch device, means including a second manually operable switch device which is maintained operative only when said device is held in a predetermined position for varying the rate of said feed movement within a given normal range, and means including a third manually operable switch device for maintaining said driving means energized to move said element at a speed above or below said normal range only during such time as said third manually operable switch device is held in a predetermined position.

36. A machine tool comprising, in combination, a movable machine tool element, electric driving means for said element, an energizing circuit for said electric driving means, a manually operable switch device for energizing said driving means to effect a relatively slow feed movement of said element and for maintaining such energization in response to a momentary actuation of said manually operable switch device, means including a second manually operable switch device which is maintained operative only when said device is held in a predetermined position for varying the rate of said feed movement within a given normal range, means including a third manually operable switch device for maintaining said driving means energized to move said element at a speed above or below said normal range only during such time as said third manually operable switch device is held in a predetermined position, and a readily mobile unitary support carrying all of said manually operable switch devices and easily movable manually by the operator to various positions about the machine tool.

37. A machine tool comprising, in combination, a translatable machine tool element, electric motor driving means for said element having a field circuit and an armature circuit, means including an adjustable rheostat interposed in said field circuit for varying the speed of operation of said machine tool element within a normal speed range, and switching means operable to energize said driving means to effect jogging of said machine tool element including means for shunting at least a portion of said rheostat and simultaneously increasing the resistance of said armature circuit, thereby effecting a relatively slower movement of said machine tool element.

WILLIAM F. RIDGWAY.